(12) United States Patent
Reineke et al.

(10) Patent No.: US 10,151,378 B2
(45) Date of Patent: Dec. 11, 2018

(54) SPROCKET ASSEMBLY WITH ADAPTER

(71) Applicant: SRAM Deutschland GmbH, Schweinfurt (DE)

(72) Inventors: Sebastian Reineke, Schweinfurt (DE); Henrik Braedt, Hambach (DE)

(73) Assignee: SRAM DEUTSCHLAND, GMBH, Schweinfurt (DE)

( * ) Notice: Subject to any disclaimer, the term of this patent is extended or adjusted under 35 U.S.C. 154(b) by 65 days.

(21) Appl. No.: 15/058,653

(22) Filed: Mar. 2, 2016

(65) Prior Publication Data

US 2016/0258523 A1 Sep. 8, 2016

(30) Foreign Application Priority Data

Mar. 2, 2015 (DE) .................. 10 2015 203 709

(51) Int. Cl.
| | |
|---|---|
| *F16H 55/12* | (2006.01) |
| *F16H 55/30* | (2006.01) |
| *B60B 27/00* | (2006.01) |
| *B62M 9/10* | (2006.01) |

(52) U.S. Cl.
CPC ............... *F16H 55/12* (2013.01); *B62M 9/10* (2013.01); *F16H 55/30* (2013.01)

(58) Field of Classification Search
CPC . F16H 55/30; B62M 9/10; B62M 9/12; B60B 27/04; B60B 27/023
USPC .................... 474/160; 310/110.5; 301/110.5
See application file for complete search history.

(56) References Cited

U.S. PATENT DOCUMENTS

| | | | | |
|---|---|---|---|---|
| 3,191,735 A | * | 6/1965 | Wavak ................. | F16D 13/683 192/110 R |
| 4,816,013 A | * | 3/1989 | Kapela .................... | F16D 41/30 474/160 |
| 5,194,051 A | * | 3/1993 | Nagano .................... | B62M 9/10 474/160 |
| 5,503,600 A | * | 4/1996 | Berecz .................... | F16H 55/30 474/160 |
| 5,935,034 A | * | 8/1999 | Campagnolo ............ | B62M 9/10 474/160 |
| 6,428,437 B1 | * | 8/2002 | Schlanger ................ | B62M 9/10 474/160 |
| 6,866,604 B2 | * | 3/2005 | Kamada ................ | B60B 27/026 474/152 |
| 7,011,592 B2 | * | 3/2006 | Shahana .................. | B62M 9/10 474/152 |

(Continued)

FOREIGN PATENT DOCUMENTS

EP 1688345 B1 9/2006

*Primary Examiner* — Henry Y Liu

(57) ABSTRACT

A sprocket assembly for a bicycle freewheel that comprises a sprocket having a central opening and an adapter constructed separately from the sprocket and adapted to be connected to the sprocket in a rotationally secure manner. The adapter comprises a central opening having an edge and a plurality of drive elements at the edge. The plurality of drive elements extend radially inwardly from the edge. The plurality of drive elements constructed to transmit torque from the sprocket to a driver on a rear wheel hub of a bicycle. A minimum radius of the central opening of the sprocket is smaller than a maximum radius of the central opening of the adapter. The minimum radius of the central opening of the sprocket is disposed on at least three locations distributed about a periphery.

21 Claims, 5 Drawing Sheets

(56) References Cited

U.S. PATENT DOCUMENTS

Figure 1A:
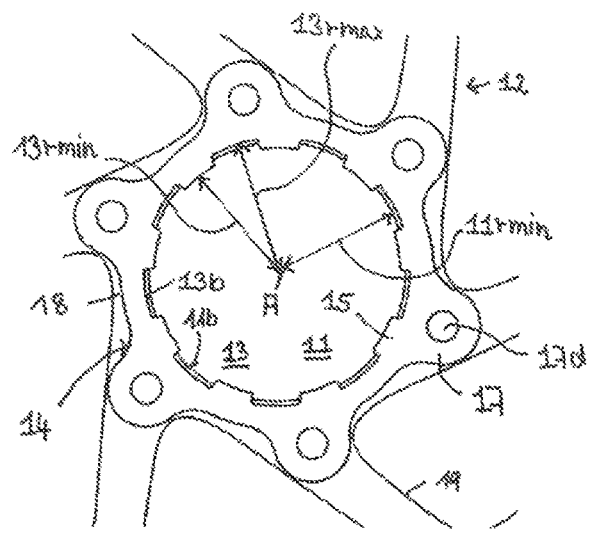

| | | | | |
|---|---|---|---|---|
| 7,044,876 B2* | 5/2006 | Kamada | ............... | B60B 27/026 29/893 |
| 7,344,463 B2* | 3/2008 | Reiter | ............... | B62M 9/10 474/160 |
| 7,351,171 B2* | 4/2008 | Kanehisa | ............ | B60B 27/026 301/111.02 |
| 7,585,240 B2* | 9/2009 | Kamada | ............... | B62M 9/10 474/148 |
| 7,871,347 B2* | 1/2011 | Kamada | ............... | B62M 9/10 474/152 |
| 7,959,529 B2* | 6/2011 | Braedt | ............... | B62M 9/10 474/152 |
| 8,096,623 B2* | 1/2012 | You | ............... | B60B 27/023 192/64 |
| 8,100,795 B2* | 1/2012 | Reiter | ............... | B62M 9/10 474/160 |
| 8,342,994 B2* | 1/2013 | Braedt | ............... | B62M 9/12 474/164 |
| 8,801,109 B2* | 8/2014 | Tho | ............... | B60B 27/0047 301/110.5 |
| 8,820,852 B2* | 9/2014 | Van Hoek | ............ | B62M 9/12 301/110.5 |
| 8,821,330 B2* | 9/2014 | Dal Pra' | ............ | B62M 9/10 474/160 |
| 8,905,878 B2* | 12/2014 | Loy | ............... | B62M 9/10 474/160 |
| 8,968,130 B2* | 3/2015 | Liao | ............... | B62M 9/10 474/160 |
| 8,974,140 B2* | 3/2015 | Durling | ............ | F16D 1/033 403/357 |
| 9,150,280 B2* | 10/2015 | Braedt | ............... | B62M 9/10 |
| 9,182,016 B2* | 11/2015 | Spahr | ............... | B62M 9/10 |
| 9,193,416 B2* | 11/2015 | Tokuyama | ............ | B62M 9/10 |
| 9,415,835 B2* | 8/2016 | Tokuyama | ............ | B62M 9/12 |
| 9,511,819 B1* | 12/2016 | Watarai | ............... | F16H 55/30 |
| 9,533,735 B2* | 1/2017 | Braedt | ............... | B62M 9/10 |
| 9,550,547 B2* | 1/2017 | Valle | ............... | B62M 9/10 |
| 2006/0014599 A1* | 1/2006 | Meggiolan | ............ | B62M 9/10 474/152 |
| 2006/0258499 A1* | 11/2006 | Kamada | ............... | B62M 9/10 474/160 |
| 2007/0054770 A1* | 3/2007 | Valle | ............... | B62M 9/10 474/160 |
| 2008/0315679 A1* | 12/2008 | Shook | ............... | B60B 27/04 301/110.5 |
| 2009/0066152 A1* | 3/2009 | You | ............... | B60B 27/04 301/106 |
| 2010/0254752 A1* | 10/2010 | Shook | ............... | B60B 27/026 403/179 |
| 2011/0105263 A1* | 5/2011 | Braedt | ............... | F16H 55/303 474/160 |
| 2011/0175433 A1* | 7/2011 | Chiang | ............... | B60B 27/023 301/110.5 |
| 2011/0193406 A1* | 8/2011 | Chiang | ............... | B60B 27/023 301/110.5 |
| 2012/0079913 A1* | 4/2012 | Dollinger | ............ | B21D 53/845 74/567 |
| 2012/0139327 A1* | 6/2012 | Chen | ............... | B60B 27/047 301/110.5 |
| 2012/0196711 A1* | 8/2012 | Loy | ............... | B62M 9/10 474/160 |
| 2012/0225745 A1* | 9/2012 | Oishi | ............... | B62M 9/10 474/160 |
| 2012/0244976 A1* | 9/2012 | Lin | ............... | B62M 9/10 474/160 |
| 2012/0302384 A1* | 11/2012 | Braedt | ............... | B62M 9/10 474/160 |
| 2013/0017914 A1* | 1/2013 | Braedt | ............... | B62M 9/10 474/160 |
| 2013/0076112 A1* | 3/2013 | Tho | ............... | B60B 27/0047 301/110.5 |
| 2014/0179474 A1* | 6/2014 | Florczyk | ............ | B62M 9/10 474/160 |
| 2014/0302956 A1* | 10/2014 | Dal Pr | ............... | B62M 9/10 474/160 |
| 2015/0018151 A1* | 1/2015 | Dal Pr | ............... | F16H 55/30 474/160 |
| 2015/0080160 A1* | 3/2015 | Staples | ............... | B62M 9/12 474/160 |
| 2015/0133249 A1* | 5/2015 | Tsai | ............... | B62M 9/12 474/160 |
| 2015/0285358 A1* | 10/2015 | Numata | ............... | F16H 55/08 474/160 |

\* cited by examiner

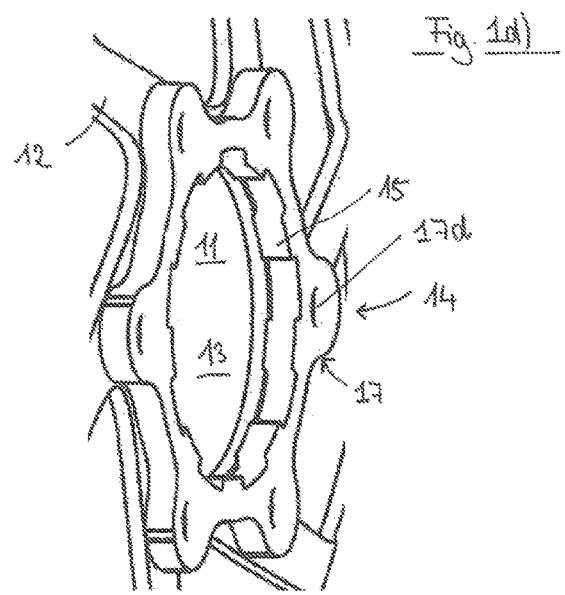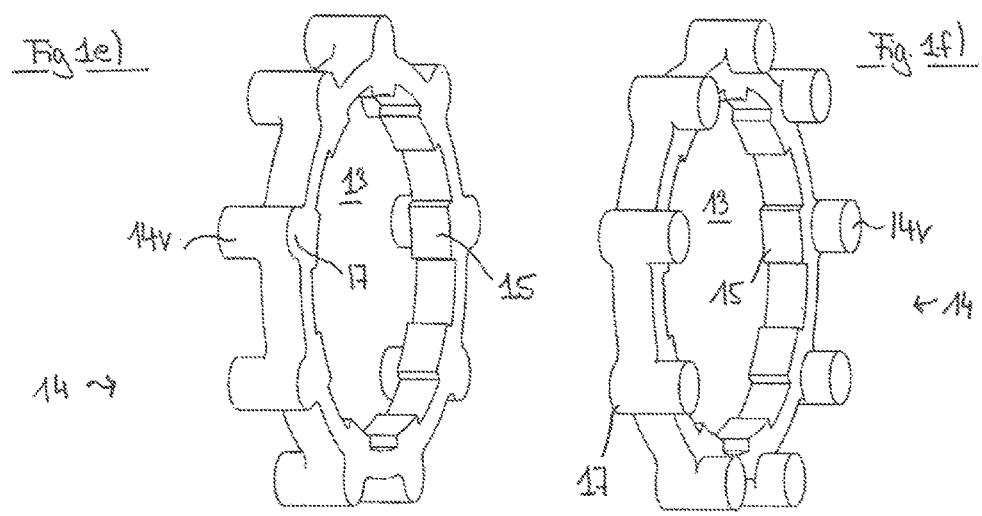

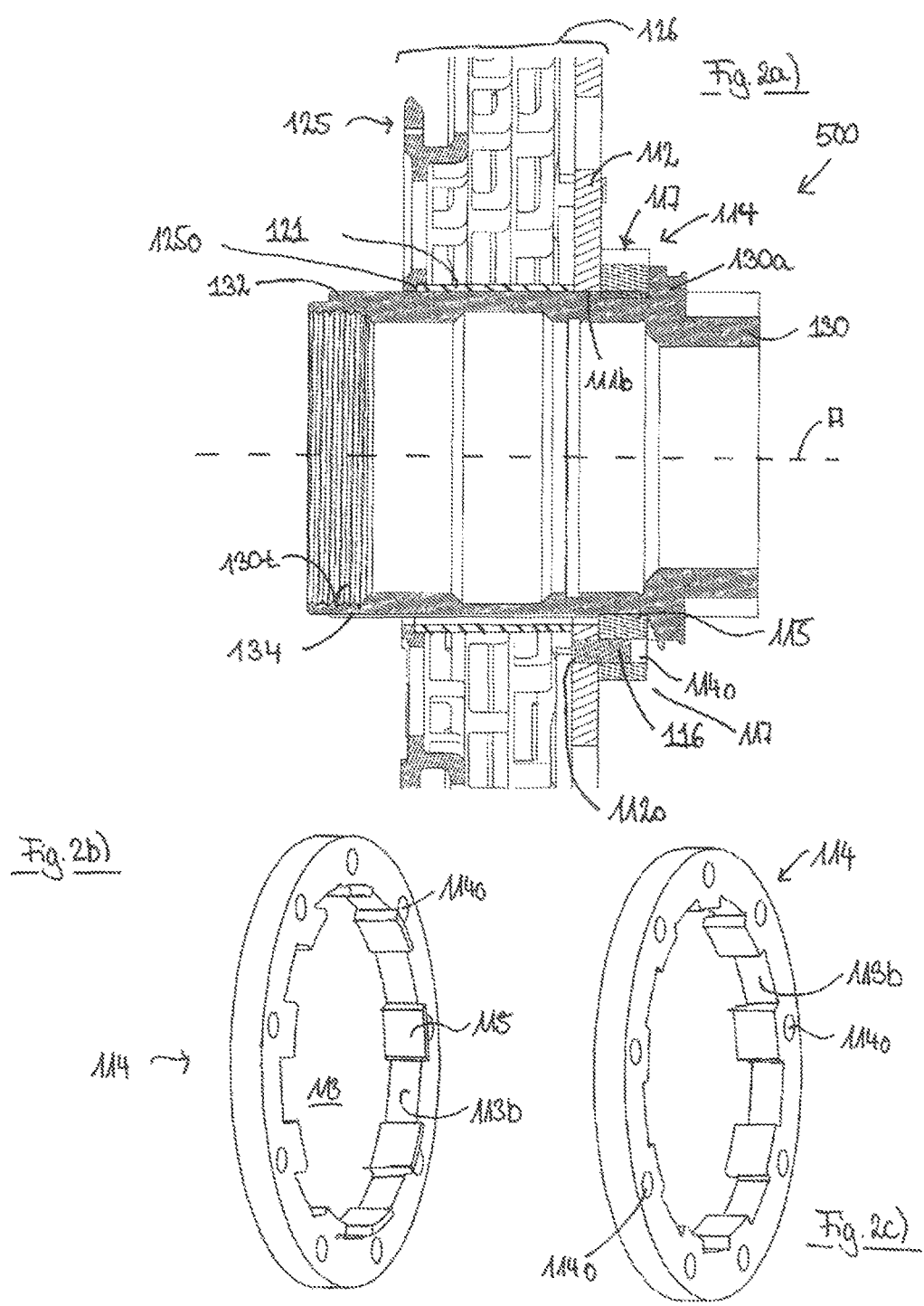

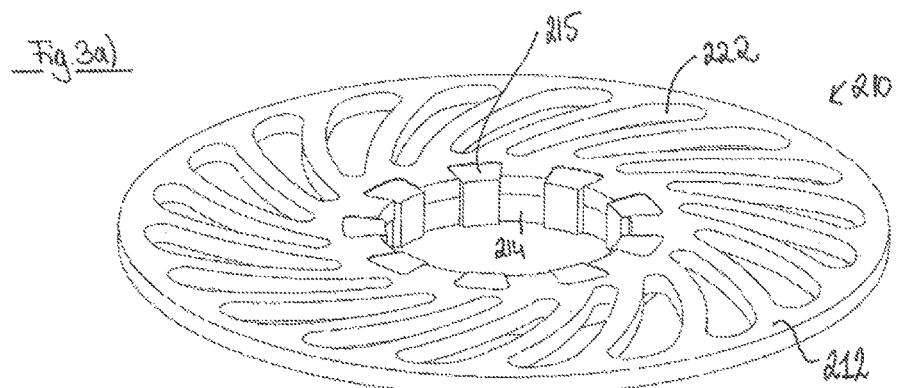
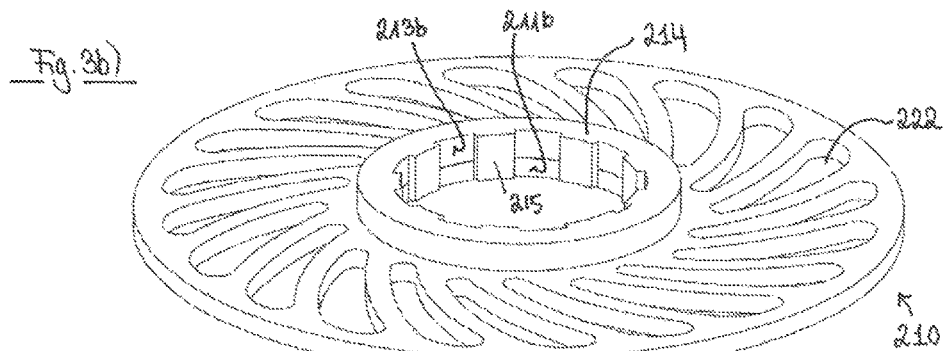
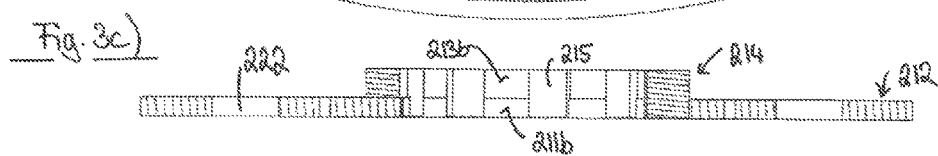
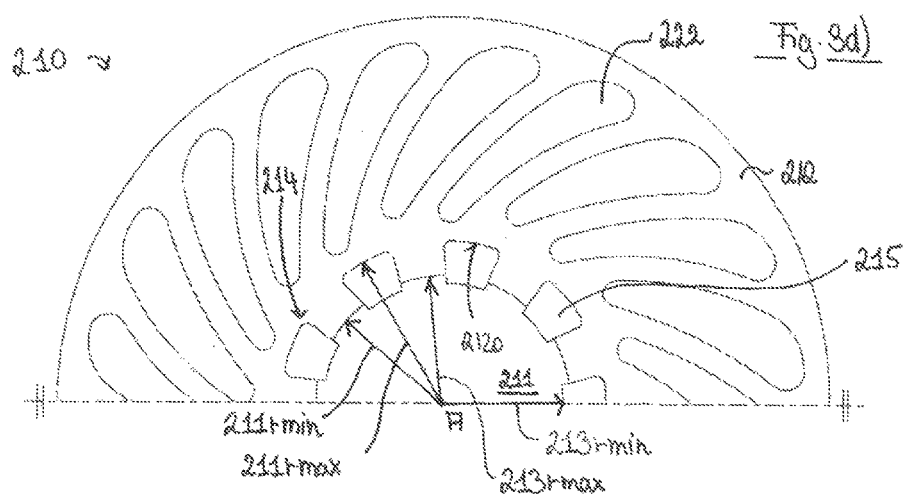

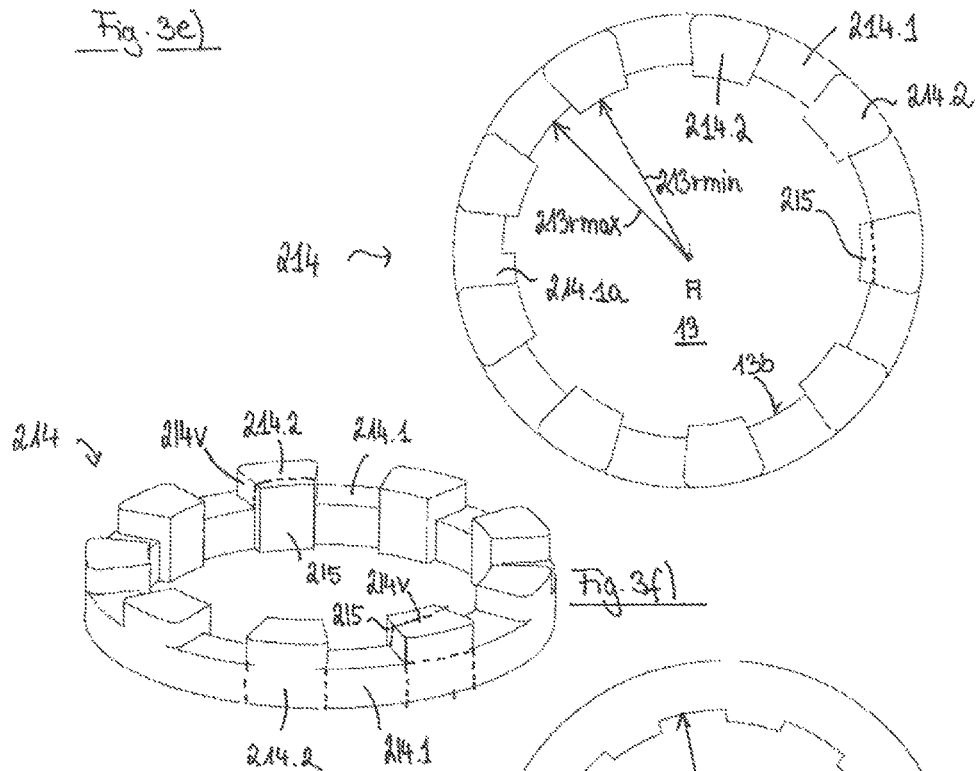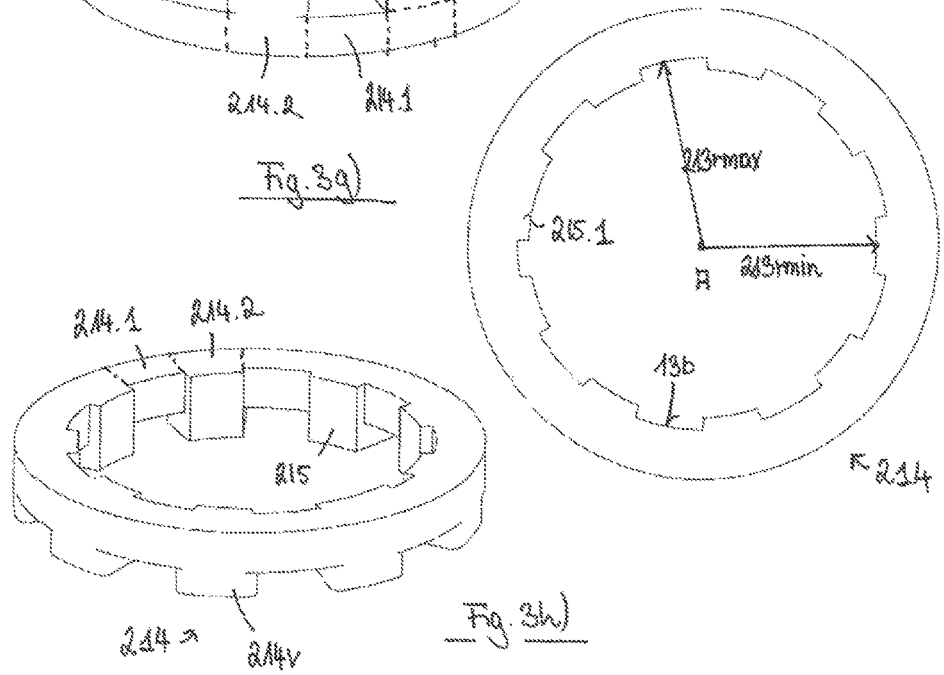

SPROCKET ASSEMBLY WITH ADAPTER

This application claims priority to, and/or the benefit of, German patent application DE 10 2015 203 709.6, filed on Mar. 2, 2015.

BACKGROUND OF THE INVENTION

The present invention relates to a sprocket assembly with an adapter.

A sprocket assembly is known, for example, from document EP 1688345 B1. In this instance, the adapter is constructed as a sprocket carrier or "spider" with an inner ring and securing arms which extend radially outwards therefrom for securing one or more sprockets. The inner profile of the adapter formed by the drive elements ensures in this instance both transmission of torque from the sprocket to the driver which is provided with a corresponding outer profile and radial centering of the sprocket assembly on the driver.

This places high demands on the production precision for the adapter, especially since this is preferably constructed to be substantially wider in the axial direction than the sprocket in order to produce a surface-area which transfers the greatest possible force, which in turn makes the correct radial centering more difficult.

On the other hand, there is known, for example, from EP 2319752 A2, a sprocket assembly in which no separate adapter at all is provided, but instead the drive elements are constructed for interaction with the outer profile of the driver directly on the inner periphery of the sprocket itself.

Although it is thereby possible to achieve relatively precise centering, the width of the drive elements is limited to the width of the sprocket so that the face which transmits force is relatively small.

In particular with the material pairing of a sprocket of steel and a driver of aluminium, this leads to embedding of the sprocket in the driver, which can destroy the driver and can make the assembly or disassembly of the sprocket assembly and the driver more difficult.

In sprocket cassettes, which are used on a specific type of driver (for instance, an XD driver), the forces and the resultant torques of all of the sprockets are further introduced via only a single end sprocket and consequently only at a single location in the driver, which further increases the problems explained above.

As a result of the manufacture process, many drivers additionally have an undercut on the axial stop. This leads to in particular the last (largest) sprocket, that is to say, the end sprocket, additionally losing coverage surface with the driver.

Both the sprocket assemblies mentioned above and known from the prior art have the common feature that the drive elements are each used both for radial centering of the sprocket assembly on the driver and for transmission of torque from the sprocket assembly to the driver.

Against this background, an object of the present invention is to further develop the sprocket assembly known from the prior art in such a manner that the radial centering is improved, without notably impairing the torque transmission in this case.

SUMMARY

To this end, there is provision according to the invention for the minimum radius of the central opening of the sprocket to be smaller than the maximum radius of the central opening of the adapter, wherein the minimum radius of the central opening of the sprocket is disposed on at least three locations distributed about the periphery, preferably about the entire periphery.

The conditions are thereby provided so that, when the sprocket and adapter are placed on the driver, the radial play between the driver and the sprocket is smaller than the radial play between the driver and adapter. The centering of the sprocket assembly on the driver is therefore brought about according to the invention via the inner profile of the sprocket, whilst the torque transmission is further brought about via the drive elements of the adapter. The functions "transmitting force or torque" and "centering sprocket" are thus distributed over two separate components.

This division of functions facilitates the production of the individual components. Via the decoupling of the functions, as a result of the better centering, the concentricity of the sprocket on the driver is improved. Furthermore, the axial expansion of the sprocket on the driver no longer limits, as in EP 2319752 A2, the surface which transmits force. This surface may in the solution according to the invention be adjusted freely over the width of the adapter, without influencing the centering. An increase of the surface-area which transmits force reduces the risk of damage to the driver.

According to the invention, the adapter and sprocket are connected to each other in a rotationally secure manner. This connection primarily serves to transmit the torque from the sprocket to the adapter since the radial forces are supported via the centering on the inner profile of the sprocket. In principle, there are various different possibilities for rotationally secure connection, for instance projections, pins, bent arms or any other positive-locking, non-positive-locking or materially engaging connection.

Preferably, the sprocket is manufactured from a material which is harder than the material of the adapter. In a particularly preferred manner, the material of the adapter has a hardness which is not greater than that of the driver. Should the harder material become pressed into the softer material in the event of excessively powerful transmission of force, therefore, it is not the driver but instead at most the adapter which thereby becomes damaged, and it can be more readily replaced and produced in a more cost-effective manner than the driver.

In a cost-effective and simple manner, the adapter may be manufactured from aluminium or glass-fiber-reinforced plastics material (GRP). Preferably, the adapter is injection moulded.

The adapter and the sprocket may, for example, be connected to each other in a rotationally secure manner by one element from the adapter and the sprocket, preferably the sprocket, comprising a plurality of axial recesses and the other element, preferably the adapter, comprising a plurality of axial projections, which are constructed to engage in the axial recesses, preferably with a press fit.

In this instance, the axial recesses are preferably constructed as axial through-openings which completely extend through the corresponding element since in this manner the axial projections of one element which are received in the through-openings of the other element are accessible from the side of the other element which faces away from the first element and, by pressure being applied to the axial projections from this side, the two elements which are mounted one on the other can simply be released from each other again.

Alternatively, the adapter and the sprocket may each comprise a plurality of axial recesses, wherein the sprocket assembly further comprises a plurality of pins, preferably steel pins, which are introduced, preferably pressed, into the axial recesses of the adapter and the sprocket so that the pins connect the adapter and the sprocket to each other in a rotationally secure manner.

This solution affords advantages with respect to the weight since the shearing forces which occur during operation are readily absorbed by the steel pins, but the adapter can be produced from a lighter material, for instance, aluminium. The absence of projections in the sprocket and adapter, thus the relatively simple "two-dimensional" geometry, enables cost-effective manufacture methods, for instance, extrusion or punching.

According to another preferred embodiment, a plurality of recesses may be provided at the edge of the central opening of the sprocket and for the adapter to be constructed as a ring of first and second peripheral portions which alternate in a peripheral direction with the basic form of circular ring segments, wherein the second peripheral portions project beyond the first peripheral portions in a radially inwardly direction and project axially towards a side which faces the sprocket in the assembled state.

In this instance, those portions of the second peripheral portions which project beyond the first peripheral portions in a radially inwardly direction, the drive elements of the adapter and those portions of the second peripheral portions which project axially beyond the first peripheral portions are constructed to engage in the recesses of the sprocket and consequently to assemble the sprocket on the adapter in a rotationally secure manner. Such an adapter can be manufactured in a particularly simple manner by an injection-moulding process and further enables good torque transmission from the sprocket to the adapter.

Finally, protection is also claimed for a drive assembly for a bicycle, comprising a sprocket assembly as described herein and a driver having a plurality of drive elements which are constructed to engage in the drive elements of the adapter in order to ensure torque transmission from the sprocket via the adapter to the driver, wherein the radial play between the driver and the sprocket is smaller than the radial play between the driver and the adapter.

In a particularly preferred manner, a transition fit or a press fit may be present between the sprocket and the driver, whilst between the adapter and the driver there is a play fit.

Also, a press fit may be present between the sprocket and driver and for a transition fit to be present between the adapter and driver.

However, it should also not be excluded that between the sprocket and the driver and between the adapter and the driver a transition fit or a press fit is present as long as the fit between the sprocket and driver is more secure than that between the adapter and the driver.

The present invention is explained below with reference to three preferred embodiments, which are illustrated in the appended Figures.

DETAILED DESCRIPTION OF THE DRAWINGS

In the drawings:

FIGS. 1a) to 1d) are different partial views of a sprocket assembly 10 according to a first embodiment of the invention;

FIGS. 1e) and 1f) are perspective views of an adapter which is slightly modified with respect to the FIGS. 1a) to 1d);

FIG. 2a) is a sectional view of a sprocket assembly 110 according to a second embodiment of the present invention with the associated driver;

FIGS. 2b) and 2c) are two perspective views of an adapter which is slightly modified with respect to the FIG. 2a);

FIGS. 3a) to 3d) are different views of a sprocket assembly 210 according to a third embodiment of the invention; and FIGS. 3e) to 3h) are different views of the adapter of FIGS. 3a) to 3d).

In order not to overload the figures, all components are not always indicated with reference numerals, in particular when a plurality of similar components are provided in one figure.

DETAILED DESCRIPTION

Figure 1B:
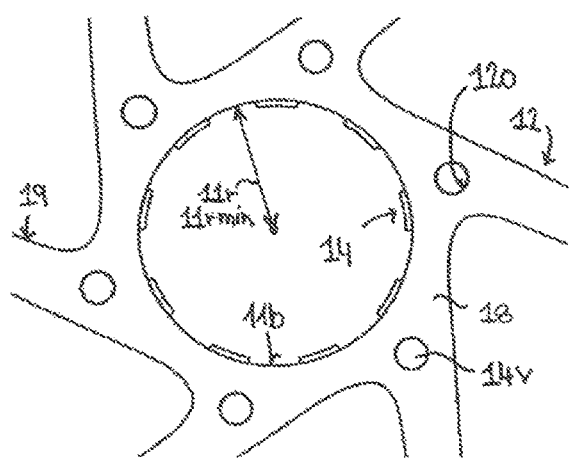

FIG. 1a) is a plan view of significant portions of a sprocket assembly 10 according to the invention, which comprises a sprocket 12 with a central opening 11 and an outer tooth arrangement which is not illustrated in the figures for reasons of space, and an adapter 14 which is mounted on the sprocket 12 in a rotationally secure manner. FIG. 1b) is a plan view of the side of the sprocket assembly 10 facing away from the viewer in the FIG. 1a).

The adapter 14 is constructed in a substantially annular manner. It has at the inner side a central opening 13 at the edge 13b of which a plurality of drive elements 15 are provided in the form of substantially circle-segment-like protruding engagement teeth which extend radially inwards from the edge 13b of the central opening 13 of the adapter 14 and which serve to transmit torque from the sprocket 12 which is connected to the adapter 14 to a driver which is not illustrated in the figures at a rear wheel hub of a bicycle. This driver conventionally has on the outer periphery thereof drive elements which engage between the drive elements 15 of the adapter 14 for torque transmission.

As shown in FIG. 1a), the radius 13r of the central opening 13 of the adapter 14 takes up as a function of the angle about the rotation axis A of the sprocket assembly 10 alternately the minimum value 13rmin thereof (on the drive elements 15) and the maximum value 13rmax thereof (between adjacent drive elements 15).

With the exception of the details described below, in particular with regard to the shape and size of the central opening 11, the sprocket 12 is a conventional sprocket of a sprocket assembly for the rear wheel hub of a bicycle, for which reason details such as the precise construction or the outer tooth arrangement of the sprocket 12 are not illustrated in the Figures. In this instance, there can be seen substantially the proximal end portions of a plurality of connection arms 19 which extend obliquely outwards in known manner from an inner ring 18 of the sprocket 12.

The sprocket 12 has in the present embodiment a central opening 11 whose radius 11r, as can be seen from the plan view in FIG. 1b), is constant over the entire periphery of the opening 11 and consequently also takes up its minimum value 11rmin (=11r) over the entire periphery.

As can be seen particularly well in the plan view in FIG. 1a), the radius 11r and consequently also the minimum radius 11rmin of the central opening 11 of the sprocket 12 is smaller than the maximum radius 13rmax of the central opening 13 of the adapter 14, that is to say, than the radius 13r of the central opening 13 of the adapter 14 between adjacent drive elements 15.

When the sprocket 12 and the adapter 14 which is mounted thereon in a rotationally secure manner are placed on the driver, this leads to the radial centering of the sprocket assembly 10 on the driver being carried out via the inner profile of the sprocket 12, whilst a torque transmission is implemented via the drive elements 15 on the inner periphery of the adapter 14.

On the outer periphery of the adapter 14 there are provided a plurality (in this instance six) of radial securing projections 17 which are distributed in a uniform manner over the outer periphery of the adapter 14 and which are substantially circular in the plan view and from which axial projections 14v (cf. FIG. 1b)) of the adapter 14 extend in the plane of projection of FIG. 1a). As a result of manufacture, there are provided at the surface of the securing projections 17, which surface can be seen in FIG. 1a), circular recesses 17d whose outline corresponds to the cross-section of the projections 14v in a plane of section perpendicular relative to the rotation axis A. However, these recesses do not have to be present.

The sprocket 12 has axial recesses or through-openings 12o which correspond to the projections 14v and which serve to receive the axial projections 14v of the adapter 14 and thus to connect the adapter 14 and sprocket 12 to each other in a rotationally secure manner. Preferably, the adapter 14 is pressed onto the sprocket 12.

Since the recesses 12o of the sprocket 12 are constructed as through-openings in the present example, the axial projections 14v of the adapter 14 which are received therein are accessible from the side of the sprocket, which side can be seen in FIG. 1b) and faces away from the adapter 12, and can thus if desired be pressed from this side out of the through-openings 12o in order to release the adapter 14 and sprocket 12 from each other again.

Figure 1C:
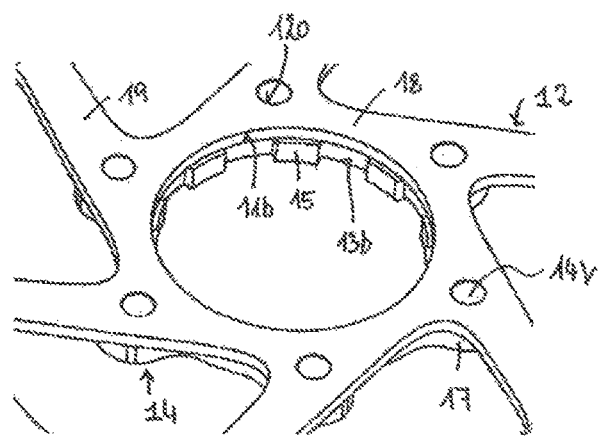

FIGS. 1c) and 1d) show different perspective views of the subject-matter of FIGS. 1a) and 1b). It may be noted that, only as a result of the selected perspective and the size relationships, the fact that the edge 11b of the central opening 11 of the sprocket 12 according to the invention projects further inwards than the regions of the edge 13b of the central opening 13 of the adapter 14 between adjacent driver elements 15 cannot be seen in these figures or can be seen only with difficulty.

FIGS. 1e) and 1f) show an adapter 14 of a modified first embodiment, which adapter is modified only slightly with respect to the adapter 14 of FIGS. 1a) to 1d), for which embodiment the same reference numerals are used as for the first embodiment. In contrast to this, in FIGS. 1e) and 1f), the diameter of the projections 14v is not smaller than but instead equal to the diameter of the securing projections 17. The axial recesses or through-openings of the sprocket are naturally intended to be adapted accordingly.

In FIGS. 1a) to 1f), the radius 11r of the central opening 11 of the sprocket 12 is constant over the entire periphery (11r=11rmin). Alternatively, the minimum radius may only be at some selected locations, at which the sprocket is then positioned or is radially supported on the drive elements of the driver. In order to thereby achieve a correct centering of the sprocket assembly 10, the minimum radius of the central opening of the sprocket is at least at three different locations or peripheral portions which are preferably distributed in a uniform manner over the periphery.

Components and features of the second and third embodiment, which correspond to those of the first embodiment, are provided with reference numerals which are derived from the corresponding reference numerals of the first embodiment by the addition of the number 100 or 200. The additional embodiments are primarily described extensively only in so far as they differ from the first embodiment, reference otherwise being made to the above description thereof.

In the second embodiment of a sprocket assembly 110 according to the invention as illustrated in FIGS. 2a) to 2c), the adapter 114 is connected to the sprocket 112 by means of separate pins 116, which are inserted in axial through-openings 112o, 114o of the sprocket 112 and the adapter 114. The pins 116 may be manufactured from a material which is capable of absorbing high shearing forces, for instance, from steel. In this instance, the adapter 114 may in turn be manufactured from a relatively light and cost-effective material.

The adapter 114, with the exception of the axial openings 114o, which are provided in this instance in place of radial projections, substantially corresponds to the adapter 14 from FIGS. 1a) to 1f) in terms of the outer shape thereof, thus having the basic shape of a circular ring, on the outer periphery of which there are provided radial securing projections 117 or securing apertures, in the center of which the axial openings 114o are located and on the inner periphery of which there are provided substantially circle-segment-like drive elements 115 which extend radially inwards.

As shown in FIG. 2a), the sprocket 112 is spaced apart by means of a spacer sleeve 121 from another sprocket 125 of the sprocket assembly 110 which forms the smallest sprocket of the sprocket group 126 illustrated in FIG. 2a), whilst the sprocket 112 constitutes the largest sprocket of the sprocket group 126.

The individual sprockets of the sprocket group 126 may be connected to each other in any desired, rotationally secure manner, for example, by means of pins, rivets, or also by a plurality of axially spaced-apart sprockets being integrally formed from a plate by means of punching and shaping.

In FIG. 2a) there is further also illustrated a driver 130 along the outer periphery of which in known manner resilient portions are alternately provided as drive elements 132 and groove portions 134 which extend in each case in an axial direction, wherein the drive elements 132 of the driver 130 are constructed to engage between adjacent drive elements 115 of the adapter 114 in order to transmit torque.

The bicycle drive assembly which is formed by the sprocket assembly 110 and the driver 130 is given the reference numeral 500.

In the sprocket assembly 110, there is provision (which cannot, however, be seen in the figures) for the radial play between the driver 130 and sprocket 112 to be smaller than the radial play between the driver 130 and adapter 114 so that the radial centering of the sprocket assembly 110 on the driver 130 is also carried out in this instance via the sprocket 112.

The radial spacing between the drive elements 115 of the adapter 114 and the groove portions 134 of the driver 130 and between the edge 113b of the central opening 113 of the adapter 114 between adjacent drive elements 115 and the resilient portions or drive elements 132 of the driver 130 is thus in each case greater than the spacing between the edge 111b of the (circular) opening 111 of the sprocket 112 and the drive elements or resilient portions 132 of the driver 130.

When the pins 116 at the side of the sprocket 122 facing towards the spacer sleeve 121 (in contrast to that illustrated in FIG. 2a)) project axially slightly beyond the sprocket 112, a centering of the spacer sleeve 121 is also enabled in the disassembled state so that a recess which is produced in a separate operation can be prevented in the sprocket 112, as provided, for example, as a recess 125o in the smallest sprocket 125.

The sprocket group 126 and if desired additional (not illustrated) individual sprockets or sprocket groups may be axially fixed in known manner between the flange portion 130a of the driver 130 as illustrated on the right in FIG. 2a) and a terminal screw (not illustrated) which is intended to be screwed into the inner thread 130t of the adapter 130.

The adapter 114 which is illustrated in FIGS. 2b) and 2d) and which is only slightly modified with respect to the adapter 114 from FIG. 2a) and which is therefore provided with the same reference numerals as that adapter differs from the adapter from FIG. 2a) substantially in that in this instance no radially outwardly protruding securing apertures are provided, but instead the axial through-openings 114o are introduced in the circular-ring-like adapter 114 in each case in the peripheral region of the drive elements 115.

FIGS. 3a) to 3d) finally shows various views of a third embodiment of a sprocket assembly 210 according to the invention, wherein FIGS. 3e) to 3h) show different views of the adapter 214 which is used in this instance.

In this instance, there are provided at the edge of the central opening 211 of the sprocket 212 a plurality of recesses 212o which expand slightly outwards in a radial direction and which can be considered both as radial recesses and as axial through-openings or recesses. The outer tooth arrangement of the sprocket 212 which generally has a plurality of weight-reducing through-openings 222 is not illustrated for reasons of simplicity.

The adapter 214 is constructed as a ring of first and second peripheral portions 214.1, 214.2 which alternate in a peripheral direction (cf. FIGS. 3e) to 3h)) each with the basic shape of circular ring segments, wherein the second peripheral portions 214.2 which are indicated in some figures by means of broken lines, project beyond the first peripheral portions 214.1 in a radially inward direction and project axially towards the side which faces the sprocket 212 in the assembled state (FIG. 3a)).

In this instance, those portions of the second peripheral portions 214.12 beyond which the first peripheral portions 214.1 project in a radially inward direction, act as drive elements 215 of the adapter 214.

The portions 214v of the second peripheral portions 214.2 which project axially beyond the first peripheral portions 214.1 are constructed to engage in the recesses 212o of the sprocket 212 and consequently to secure the sprocket 212 to the adapter 214 in a rotationally secure manner.

A special drive element 215.1 (cf. FIG. 3g)) may in this instance be constructed to be longer in the peripheral direction than in the others. This specific drive element 215.1 corresponds in known manner to a special groove portion of the driver which is not illustrated in this instance and serves to position the sprocket assembly 210 in a specific predetermined angular position on the driver. Alternatively, it could also be said that a specific first peripheral portion 214.1a is constructed slightly differently from the remaining first peripheral portions 214.1.

Also in the embodiment of FIGS. 3a) to 3h), the minimum radius 211rmin of the central opening 211r of the sprocket 212 (which is assumed in this instance at nine peripheral portions of the central opening 211 which are distributed over the periphery) is smaller than the maximum radius 213rmax of the central opening 213 of the adapter 214, although unfortunately this cannot be seen very well in the drawings as a result of the size relationships.

The recesses or indentations 212o in the sprocket for the engagement elements 214v of the adapter 214 are sized in accordance with the surface-pressure specification of the material used. The same applies to the axial expansion of the radial engagement profile on the driver (not illustrated).

The adapter ring 214 which is illustrated in FIGS. 3e) to 3h) may in a particularly simple manner be produced as a component which is constructed in an integral manner with an injection-moulding process and be mounted on the sprocket 212 simply by being pushed or pressed thereon.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A sprocket assembly for a bicycle freewheel, comprising:
a sprocket having a central opening; and
an adapter constructed separately from the sprocket and adapted to be connected to the sprocket in a rotationally secure manner, the adapter comprising a central opening having an edge and a plurality of drive elements at the edge, the plurality of drive elements extending radially inwardly from the edge, the drive elements constructed to transmit torque from the sprocket to a driver on a rear wheel hub of a bicycle,
wherein a minimum radius of the central opening of the sprocket is larger than a minimum radius, and smaller than a maximum radius, of the central opening of the adapter, the minimum radius of the central opening of the sprocket disposed on at least three locations distributed about a periphery.

2. The sprocket assembly according to claim 1, wherein the minimum radius of the central opening of the sprocket is disposed about the entire periphery.

3. The sprocket assembly according to claim 1, wherein the sprocket is manufactured from a material which is harder than a material of the adapter.

4. The sprocket assembly according to claim 3, wherein the adapter is manufactured from one of aluminium and glass-fibre-reinforced plastic.

5. The sprocket assembly according to claim 4, wherein the adapter is injection moulded.

6. The sprocket assembly according to claim 1, wherein one of the adapter and the sprocket comprises a plurality of axial recesses and the other of the adapter and the sprocket comprises a plurality of axial projections constructed to engage in the axial recesses.

7. The sprocket assembly according to claim 6, wherein the plurality of projections are constructed to engage in the axial recesses with a press fit and the axial recesses are constructed as axial through-openings.

8. The sprocket assembly according to claim 1, wherein the adapter and the sprocket each comprise a plurality of axial recesses, wherein the sprocket assembly further comprises a plurality of pins introduced into the axial recesses of the adapter and the sprocket so that the pins connect the adapter and the sprocket to each other in a rotationally secure manner.

9. The sprocket assembly according to claim 8, wherein the pins are manufactured from steel and pressed into the axial recesses of the adapter and the sprocket.

10. The sprocket assembly according to claim 1, wherein a plurality of recesses are provided at the edge of the central opening of the sprocket and the adapter is constructed as a ring of first and second peripheral portions which alternate in a peripheral direction with a basic shape of circular ring segments, wherein the second peripheral portions project beyond the first peripheral portions in a radially inwardly direction and project axially toward a side of the adapter which faces the sprocket in the state fixed to the sprocket, wherein the portions of the second peripheral portions which project beyond the first peripheral portions in a radially inwardly direction form the drive elements of the adapter and the portions of the second peripheral portions which axially project beyond the first peripheral portions are constructed to engage in the recesses of the sprocket.

11. A drive assembly for a bicycle, the drive assembly comprising:
a sprocket assembly comprising:
a sprocket having a central opening, and
an adapter constructed separately from the sprocket and adapted to be connected to the sprocket in a rotationally secure manner, the adapter comprising a central opening having an edge, a plurality of drive elements at the edge, the plurality of drive elements extending radially inwardly from the edge, the drive elements constructed to transmit torque from the sprocket to a driver on a rear wheel hub of a bicycle,
wherein a minimum radius of the central opening of the sprocket is smaller than a maximum radius, and larger than a minimum radius, of the central opening of the adapter, the minimum radius of the central opening of the sprocket disposed on at least three locations distributed about a periphery; and
a driver having a plurality of drive elements constructed to engage between the drive elements of the adapter to ensure torque transmission from the sprocket via the adapter to the driver, wherein the radial play between the driver and the sprocket is smaller than the radial play between the driver and the adapter.

12. The drive assembly according to claim 11, wherein between the sprocket and the driver there is one of a transition fit and press fit, whilst between the adapter and the driver there is a play fit.

13. The drive assembly according to claim 11, wherein the minimum radius of the central opening of the sprocket is disposed about the entire periphery.

14. The drive assembly according to claim 11, wherein the sprocket is manufactured from a material which is harder than a material of the adapter.

15. The drive assembly according to claim 14, wherein the adapter is manufactured from one of aluminium and glass-fibre reinforced plastic.

16. The drive assembly according to claim 15, the adapter is injection moulded.

17. The drive assembly according to claim 11, wherein one of the adapter and the sprocket comprises a plurality of axial recesses and the other of the adapter and the sprocket comprises a plurality of axial projections constructed to engage in the axial recesses.

18. The drive assembly according to claim 17, wherein the plurality of projections are constructed to engage in the axial recesses with a press fit and the axial recesses are constructed as axial through-openings.

19. The drive assembly according to claim 11, wherein the adapter and the sprocket each comprise a plurality of axial recesses, wherein the sprocket assembly further comprises a plurality of pins introduced into the axial recesses of the adapter and the sprocket so that the pins connect the adapter and the sprocket to each other in a rotationally secure manner.

20. The drive assembly according to claim 19, wherein the pins are manufactured from steel and pressed into the axial recesses of the adapter and the sprocket.

21. The sprocket assembly according to claim 11, wherein a plurality of recesses are provided at the edge of the central opening of the sprocket, and the adapter is constructed as a ring of first and second peripheral portions which alternate in a peripheral direction with a shape of circular ring segments, wherein the second peripheral portions project beyond the first peripheral portions in a radially inwardly direction and project axially toward a side of the adapter which faces the sprocket in the state fixed to the sprocket, wherein the portions of the second peripheral portions which project beyond the first peripheral portions in a radially inwardly direction form the drive elements of the adapter and the portions of the second peripheral portions which axially project beyond the first peripheral portions are constructed to engage in the recesses of the sprocket.

* * * * *